United States Patent [19]

Stahl

[11] Patent Number: 5,132,054

[45] Date of Patent: Jul. 21, 1992

[54] COMPOSITION OF MATTER FOR A FIRE RETARDANT INTUMESCENT MATERIAL HAVING TWO STAGES OF EXPANSION AND A PROCESS FOR MAKING THEREOF

[75] Inventor: James Stahl, Ringoes, N.J.

[73] Assignee: Specified Technologies Inc., Somerville, N.J.

[21] Appl. No.: 700,965

[22] Filed: May 16, 1991

[51] Int. Cl.$^5$ ............................................. C09K 21/00
[52] U.S. Cl. ..................................... 252/606; 428/71; 428/305.5; 428/921; 106/18.12
[58] Field of Search ...................... 252/606; 428/402.1, 428/305.6, 71, 921; 106/18.12

[56] References Cited

U.S. PATENT DOCUMENTS

| | | | |
|---|---|---|---|
| 3,449,161 | 6/1969 | Hindersinn et al. | 117/136 |
| 3,513,114 | 5/1970 | Hahn et al. | 260/8 |
| 3,730,891 | 5/1973 | Riccitiello et al. | 252/8.1 |
| 3,819,550 | 6/1974 | Riccitiello et al. | 252/8.1 |
| 3,849,178 | 11/1974 | Feldman | 117/72 |
| 3,855,134 | 12/1974 | Green et al. | 252/8.1 |
| 3,916,057 | 10/1975 | Hatch et al. | 428/236 |
| 3,983,082 | 9/1976 | Pratt et al. | 260/2.55 |
| 4,018,983 | 4/1977 | Pedlow | 174/135 |
| 4,026,810 | 5/1977 | Bost | 252/8.1 |
| 4,052,526 | 10/1977 | Pratt et al. | 428/447 |
| 4,061,579 | 12/1977 | Sawko et al. | 252/8.1 |
| 4,065,394 | 12/1977 | Pratt et al. | 252/8.1 |
| 4,104,073 | 8/1978 | Koide et al. | 252/8.1 |
| 4,118,325 | 10/1978 | Becker et al. | 252/8.1 |
| 4,166,743 | 9/1979 | Wortmann et al. | 252/8.1 |
| 4,201,593 | 5/1980 | Sienkowski et al. | 252/8.1 |
| 4,201,677 | 5/1980 | Shukla et al. | 252/8.1 |
| 4,216,261 | 8/1980 | Dias | 252/8.1 |
| 4,234,639 | 11/1980 | Graham | 252/8.1 |
| 4,247,435 | 1/1981 | Kasten | 252/8.1 |
| 4,339,357 | 7/1982 | Nicholson et al. | 252/606 |
| 4,341,694 | 7/1982 | Halpern | 252/606 |
| 4,382,884 | 5/1983 | Rohringer et al. | 252/606 |
| 4,529,467 | 7/1985 | Ward et al. | 52/232 |
| 4,588,523 | 5/1986 | Tashlick et al. | 252/606 |
| 4,663,226 | 5/1987 | Vajs et al. | 428/305.5 |
| 4,743,625 | 5/1988 | Vajs et al. | 521/122 |
| 4,758,003 | 7/1988 | Goldstein et al. | 277/1 |
| 4,816,312 | 3/1989 | Annemaier et al. | 428/74 |
| 4,849,135 | 7/1989 | Reitz | 252/606 |

Primary Examiner—Robert L. Stoll
Assistant Examiner—N. Bhat
Attorney, Agent, or Firm—Sperry, Zoda & Kane

[57] ABSTRACT

An intumescent material and a process for forming of an intumescent material is disclosed including a two stage intumescent expansion characteristic. The composition includes an intumescent material having a primary expansion ingredient such as expanding graphite in combination with a pre-expansion material adapted to provide intumescent expansion at a temperature less than that of the primary expansion material. The pre-expansion material preferably is a liquid isobutane encapsulated within microspheres of any latex material or polyvinylidene. The pre-expansion step allows for a low density mass having fairly uniform dimensions relative to the original proportions of the specimen. A novel process for forming same allows heating to a temperature greater than the pre-expansion temperature within a closed mold to prevent pre-expansion by containment therein and still allow heat fusing of the fire barrier form.

33 Claims, 1 Drawing Sheet

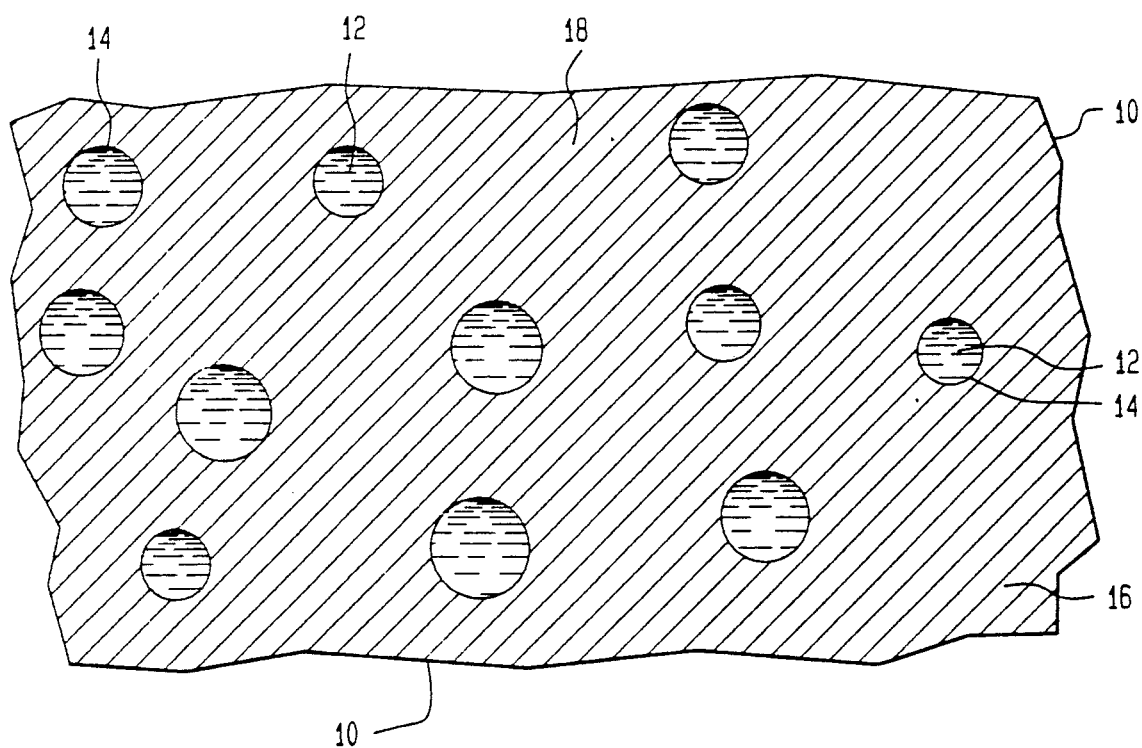

COMPOSITION OF MATTER FOR A FIRE RETARDANT INTUMESCENT MATERIAL HAVING TWO STAGES OF EXPANSION AND A PROCESS FOR MAKING THEREOF

BACKGROUND OF THE INVENTION

1. Field of the Invention

The present invention deals with intumescent materials utilized for providing a fire barrier at various locations as desired. These fire barriers are adapted to expand when heated above a predetermined temperature to form a fire barrier by expansion. The level of expansion must be controlled such as not to be so violent that it is difficult to contain. Certain intumescent products are expanded in such a violent manner that containment is not possible since they tend to behave like popcorn. They would thus expand rapidly and tend to spall or blow the material itself apart. Therefore the resultant expansion would not have the fire barrier characteristic in the desired location.

2. Description of the Prior Art

Prior art devices have been utilized for providing intumescent expansion which can be utilized with materials in many forms such as latex caulks, putties, water based mastic compounds or more firm materials such as wrappings or fixed shaped intumescent forms. Examples of such products utilizing the intumescent expansion characteristics are shown in U.S. Pat. No. 3,449,161 patented Jun. 10, 1969 to R. Hindersinn et al on Fire Retardant Intumescent Coating Compositions; U.S. Pat. No. 3,513,114 patented May 19, 1970 to F. Hahn et al on Intumescent Coating Compositions; U.S. Pat. No. 3,730,891 patented May 1, 1973 to S. Riccitiello et al on an Intumescent Composition, Foamed Product Prepared Therewith, And Process For Making Same; U.S. Pat. No. 3,819,550 patented Jun. 25, 1974 to S. Riccitiello et al on an Intumescent Composition, Foamed Product Prepared Therewith And Process For Making Same; U.S. Pat. No. 3,849,178 patented Nov. 19, 1974 to R. Feldman on a Thermal Protective Process And Article Coated With Thermal Protective Composition; U.S. Pat. No. 3,855,134 patented Dec. 17, 1974 to J. Green et al on an Intumescent Composition; U.S. Pat. No. 3,916,057 patented Oct 28, 1975 to R. Hatch et al on an Intumescent Sheet Material; U.S. Pat. No. 3,983,082 Sept. 28, 1976 to R. Pratt et al on an Intumescent Fire Retardant Material And Article; U.S. Pat. No. 4,018,983 patented Apr. 19, 1977 to J. Pedlow on an Electrical Arc And Fire Protective Sheath, Boot Or The Like; U.S. Pat. No. 4,026,810 patented May 31, 1977 to H. Bost on Intumescent Flame Retardants; U.S. Pat. No. 4,052,526 patented Oct. 4, 1977 to R. Pratt et al on Intumescent Fire Retardant Material And Article; U.S. Pat. No. 4,061,579 patented Dec. 6, 1977 to P. Sawko et al on Intumescent Coatings Containing 4,4'-Dinitrosulfanilide; U.S. Pat. No. 4,065,394 patented Dec. 27, 1977 to R. Pratt et al on an Intumescent Fire Retardant Material; U.S. Pat. No. 4,104,073 patented Aug. 1, 1978 to Y. Koide et al on Fire Retardant Intumescent Putty; U.S. Pat. No. 4,118,325 patented Oct. 3, 1978 to D. Becker et al on a Fireproofing Composition; U.S. Pat. No. 4,166,743 Sept. 4, 1979 to J. Wortmann et al on Intumescent Flame-Retardant Coating Compositions; U.S. Pat. No. 4,201,593 patented May 6, 1980 to K. Sienkowski et al on a Novel Intumescent Composition; U.S. Pat. No. 4,201,677 patented May 6, 1980 to J. Shukla et al on an Intumescent Composition Comprising Cyclic Nitrogen Compound And Phosphorus Compounds; U.S. Pat. No. 4,216,261 patented Aug. 5, 1980 to G. Dias on a Semi-Durable, Water Repellant, Fire Resistant Intumescent Process; U.S. Pat. No. 4,234,639 Nov. 18, 1980 to J. Graham on Intumescent Fire-Retardant Products; U.S. Pat. No. 4,247,435 patented Jan. 27, 1981 to N. Kasten on Intumescent Fire Retardant Coating Compositions; U.S. Pat. No. 4,339,357 patented Jul. 13, 1982 to R. Nicholson et al on an Intumescent Composition; U.S. Pat. No. 4,341,694 Jul. 27, 1982 to Y. Halpern on Intumescent Flame Retardant Compositions; U.S. Pat. No. 4,382,884 patented May 10, 1983 to P. Rohringer et al on a Fire-Retardant, Intumescent Composition And Its Use For The Flameproofing Of Substrates, And As A Fire-Extinguishing Agent Comprising An Ammonium Salt, A Water-Soluble Nitrogen Compound As A Blowing Agent And Dextrin; U.S. Pat. No. 4,529,467 patented Jul. 16, 1985 to T. Ward et al on a Fire Protective Intumescent Mastic Composition And Method Employing Same; U.S. Pat. No. 4,588,523 May 13, 1986 to I. Tashlick et al on Intumescent Fire Retardant Compositions; U.S. Pat. No. 4,743,625 patented May 10, 1988 to L. Vajs on a Fire Retardant Mixture For Protection Of Suitable Composite Products; U.S. Pat. No. 4,758,003 patented Jul. 19, 1988 to M. Goldstein et al on a Method And Apparatus For Changing Physical And Chemical Properties Of Materials; U.S. Pat. No. 4,816,312 patented Mar. 28, 1989 to D. Annemaier on Fire Prevention Material and U.S. Pat. No. 4,849,135 patented Jul. 18, 1989 to R. Reitz on Ethylene Copolymers With Enhanced Fire Resistant Properties.

SUMMARY OF THE INVENTION

The present invention provides a process for making of a fire retardant intumescent material which includes two stages of expansion. Initially the base material is mixed with respect to a fire retardant material which includes a primary expansion component thereof such as expanding graphite, unexpanded vermiculite or sodium silicate. These products are generally capable of expansion at approximately 325 degrees Fahrenheit in such a manner as to form a fire-retardant barrier.

A plurality of microspheres preferably formed of latex material and filled with another expanding material such as liquid isobutane are mixed with the fire retardant material to provide a lower temperature expansion characteristic. This lower temperature or pre-expansion temperature preferably will occur in the area of 210 degrees Fahrenheit when utilizing liquid isobutane. Normally the outer shell of the microspheres will be formed of a latex material, a vinylidene chloride, a vinyl acetate, an acrylic resin or an acrylic latex. These microspheres aid in distributing the encapsulated units of liquid isobutane throughout the base material and the primary expansion component thereof.

With this configuration the application of heat to the intumescent material will initially cause an expansion to occur at approximately 210 degrees Fahrenheit which normally depending upon the amount of liquid isobutane microspheres within the product will expand the entire mass as much as 300 percent. This reaction occurs at about 210 degrees Fahrenheit when utilizing this liquid isobutane. As such this initial or pre-expansion forms a low density mass with fairly uniform dimensions conforming to the original proportions of the specimen.

Normally the primary intumescent material will be an expanding graphite which then provides a second stage expansion at about 325 degrees Fahrenheit. This expansion tends to be largely contained within the mass and the expansion extends out to approximately 700 percent and beyond while maintaining relatively uniform dimensions of the specimen.

The resulting composition of matter preferably is usable when forming latex caulks, putties and water based mastic compounds which are normally manually placed into position where desired to provide the intumescent fire barrier.

Other intumescent fire barriers have a more fixed form and are less mastic such as pipe wraps and intumescent fixtures or blocks. These materials are normally formed of a heat fusible material. The heat fusible material normally can include a polyvinyl chloride resin mixable with a liquid plasticizer. This combination when heated will heat fuse to conform to the desired form and shape. The amount of heat necessary for heat fusing of this polyvinyl chloride resin and liquid plasticizer is normally approximately 300 degrees Fahrenheit. It would not be expected that the composition of matter of the present invention could be heated in this manner due to the pre-expansion intumescent step which normally occurs at about 210 degrees Fahrenheit. However when the specimen of the present invention is placed within a closed mold the heating and heat fusing of the heat fusible material can be made possible without initiating pre-expansion due to the closed mold configuration and the absence of any area into which expansion can take place.

It is an object of the present invention to provide a composition of matter for providing a fire retardant intumescent material with two stages of expansion as well as a process for making thereof which is relatively inexpensive.

It is an object of the present invention to provide a composition of matter for providing a fire retardant intumescent material with two stages of expansion as well as a process for making thereof which forms effective fire barriers where desired.

It is an object of the present invention to provide a composition of matter for providing a fire retardant intumescent material with two stages of expansion as well as a process for making thereof which provides a pre-expansion step for maintaining the original proportions of the specimen during the pre-expanding and the final expanding.

It is an object of the present invention to provide a composition of matter for providing a fire retardant intumescent material with two stages of expansion as well as a process for making thereof which provides increased volume in the final expansion step.

It is an object of the present invention to provide a composition of matter for providing a fire retardant intumescent material with two stages of expansion as well as a process for making thereof which is usable with microspheres of polyvinyl chloride filled with liquid isobutane which acts as the pre-expansion material.

It is an object of the present invention to provide a composition of matter for providing a fire retardant intumescent material with two stages of expansion as well as a process for making thereof which is usable with heretofore conventional intumescent ingredients such as expanding graphite.

It is an object of the present invention to provide a composition of matter for providing a fire retardant intumescent material with two stages of expansion as well as a process for making thereof which is usable with heretofore convention intumescent ingredients such as unexpanded vermiculite.

It is an object of the present invention to provide a composition of matter for providing a fire retardant intumescent material with two stages of expansion as well as a process for making thereof which is usable with heretofore conventional intumescent ingredients such as sodium silicate.

It is an object of the present invention to provide a composition of matter for providing a fire retardant intumescent material with two stages of expansion as well as a process for making thereof which provides an initial pre-expansion of the specimen in the area of approximately 300 percent at 210 degrees Fahrenheit.

It is an object of the present invention to provide a composition of matter for providing a fire retardant intumescent material with two stages of expansion as well as a process for making thereof which provides a second stage expansion at 325 degrees Fahrenheit to an overall dimension of at least as great as 700 percent.

It is an object of the present invention to provide a composition of matter for providing a fire retardant intumescent material with two stages of expansion as well as a process for making thereof which provides an intumescent expansion which is controllable.

It is an object of the present invention to provide a composition of matter for providing a fire retardant intumescent material with two stages of expansion as well as a process for making thereof which slows expansion and minimizes spalling.

It is an object of the present invention to provide a composition of matter for providing a fire retardant intumescent material with two stages of expansion as well as a process for making thereof which minimizes blowing apart of the basic intumescent material commonly experienced with such products.

It is an object of the present invention to provide a composition of matter for providing a fire retardant intumescent material with two stages of expansion as well as a process for making thereof which provides two levels of expansion capable of being responsive to two different temperatures.

It is an object of the present invention to provide a composition of matter for providing a fire retardant intumescent material with two stages of expansion as well as a process for making thereof which utilizes a chemical blowing agent or expansion of gas as the pre-expansion step.

It is an object of the present invention to provide a composition of matter for providing a fire retardant intumescent material with two stages of expansion as well as a process for making thereof which can be used to provide various different shapes and consistencies of fire retardant intumescent material.

It is an object of the present invention to provide a composition of matter for providing a fire retardant intumescent material with two stages of expansion as well as a process for making thereof which allows for formation of a firm intumescent form from heat fusion material having a fusion temperature greater than at least one of the intumescent components in the intumescent material.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

The drawing is a schematic illustration of an embodiment of the composition of matter for fire retardant intumescent material of the present invention.

DETAILED DESCRIPTION OF THE PREFERRED EMBODIMENT

The present invention provides a means for forming a fire-retardant barrier of fire retardant material 10. The material 10 preferably includes a primary expansion material 18 which can be in any form and of any consistency. A plurality of encapsulating means 14 such as microspheres will hold a pre-expansion material 12 therein such as liquid isobutane. The pre-expanding material 12 will provide an intumescent characteristic to the composition of matter to facilitate expansion thereof at a temperature lower than the temperature of expansion of the primary expansion material 18. Thus the two stage intumescence will be provided first at a lower temperature by the pre-expanding material 12 and secondly at a higher temperature by the primary expansion material 18.

It has been found that the formation of an intumescent material having a two step intumescence provides an increase in the volume of the resulting expansion and also a dimension stability in the product. The primary expansion achieved through the primary expansion material 18 is achieved by any of the normally used intumescent components. These components may include unexpanded vermiculite or expanding graphite or sodium silicate. The choice of materials basically depends upon the type of materials and the specific applications of the product. Any of these materials provide a primary intumescent characteristic capable of expansion at about 325 degrees Fahrenheit. With the present invention the pre-expanding material 12 provides a means for initial expansion of the intumescent material at a lower temperature normally in the area of around 210 degrees Fahrenheit. The pre-expanding material 12 preferably takes the form liquid isobutane which has been shown to facilitate expansion of specimens as much as 300 percent at approximately 210 degrees Fahrenheit. The liquid isobutane is normally contained within microspheres wherein the external skin thereof can be formed of preferably a polyvinyl chloride. Alternatively any latex material has been shown to be effective to comprise the material of the encapsulating means 14 as well as vinyl acetate, acrylic resins or acrylic latexes. Any of these materials has been found to be useful for isolating the liquid isobutane from the other materials of the intumescent product and for facilitating expansion of the liquid isobutane when the intumescent product is exposed to temperatures of approximately 210 degrees Fahrenheit. By minimizing the amount of the total expansion to approximately 300 percent through the pre-expanding step the intumescent material has been found to maintain fairly uniform dimensions relative to the original proportion of the material and to still form a fairly low density final mass.

As such when the primary expanding material such as expanding graphite, unexpanded vermiculite or sodium silicate initiates the second expansion step at approximately 325 degrees Fahrenheit the expansion tends to be largely contained within the mass and extends outwardly to as much as 700 percent or more while still maintaining relatively uniform dimensions of the original intumescent material shape.

The use of the expanding microspheres formed by the combination of the encapsulating means 14 and the pre-expanding material 10 is unique in providing a second stage or step of intumescence in a product at a temperature less than the temperature of the primary intumescent component therein. This two stage system provides an improved dimensional stability of the compounds regardless of the primary expansion agent.

Another particular novel aspect of the composition and process of the present invention is in the formation of less mastic intumescent forms. Intumescent forms are often made through a molding process from heat fusible materials 16. These heat fusible materials preferably include two components which when subjected to elevated temperatures create a firm form which itself maintains the intumescent characteristics but allows for more easy mounting or the like in areas where a latex caulk, putty or water based mastic compound are not usable. These firm forms of intumescent materials preferably are formed of a heat fusible material 16 such as a combination of a polyvinyl chloride resin and a liquid plasticizer. When this heat fusible combination is subjected to a temperature of approximately 300 degrees Fahrenheit the heat fusion occurs and a firm form is created allowing placement or mounting as desired to provide an intumescent fire barrier. Normally it would be expected that such heat fusible material would not be usable with an intumescent product wherein the temperature of expansion of an intumescent component is less than the temperature of heat fusion of the heat fusible product. The present invention provides a novel process wherein the components of the heat fusible material as well as both the pre-expanding intumescent material 12 and the primary expanding material 18 are all placed within a closed mold. Heat is applied to this mold and the temperature of the heat fusible material is caused to be raised to approximately 300 degrees Fahrenheit such that heat fusion occurs. However due to the fact that the material is fully placed within a closed mold expansion of for example the pre-expanding material liquid isobutane 12 is not possible and therefore expansion will not occur. The temperature of the finally heat fused material is then brought down to a level below the expansion temperature of the pre-expanding material 12 prior to removal from the closed mold. As such that expansion of the pre-expanding material 12 can be looked upon as being stored within the heat fused material in such a manner as to be ready to provide a pre-expansion step at in the example herein 210 degrees Fahrenheit when subjected to fire conditions.

This process if a very important step in the formation of an intumescent material since two stage intumescence normally requires a temperature difference between the higher and the lower intumescent components. The capability of use of this two stage material with a heat fusible product wherein the temperature of heat fusion is greater than the temperature of intumescence of one of the components is a novel and distinct application of the composition and process of the present invention.

Such factory finished products or formed intumescent products are normally formed with metal plates or metal forms which allow for focusing or directionalizing of the intumescence of the product as desired depending on the application. The two stage intumescence of the present invention in combination with the heat fusible material provides a product not available heretofore in the prior art. This type of an intumescent product has not been available in a factory finished product and is only possible because of the composition of matter and novelty of the process of the present invention.

Another novel aspect of the present invention is the combination of a heat fusible material with an intumescent expansion material. This is particularly novel when the heat fusible material includes a polyvinyl chloride resin and a plasticizer to aid in the heat fusing of the basic material.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A composition of matter for a fire retardant intumescent material having two stages of expansion comprising:
   a) a primary expansion material adapted to expand responsive to being exposed to a primary given temperature;
   b) a pre-expansion means mixed throughout said primary expansion material and adapted to provide an additional stage of expansion responsive to a secondary given temperature which is less than the primary given temperature, said pre-expansion material comprising:
      (1) a plurality of discrete encapsulation means defining an internal chamber means therein; and
      (2) a pre-expansion material located within said internal chamber means defined within said encapsulation means, said pre-expansion material adapted to expand responsive to a second given temperature which is less than the primary given expansion temperature of said primary expansion material.

2. A composition of matter for a fire retardant intumescent material having two stages of expansion as defined in claim 1 wherein said discrete encapsulation means comprises a plurality of microsphere shaped units.

3. A composition of matter for a fire retardant intumescent material having two stages of expansion as defined in claim 1 wherein said discrete encapsulation means is made from a latex material.

4. A composition of matter for a fire retardant intumescent material having two stages of expansion as defined in claim 1 wherein said descrete encapsulation means is made from vinylidene chloride.

5. A composition of matter for a fire retardant intumescent material having two stages of expansion as defined in claim 1 wherein said discrete encapsulation means is made from vinyl acetate.

6. A composition of matter for a fire retardant intumescent material having two stages of expansion as defined in claim 1 wherein said discrete encapsulation means is made from an acrylic resin.

7. A composition of matter for a fire retardant intumescent material having two stages of expansion as defined in claim 1 wherein said discrete encapsulation means is made from an acrylic latex.

8. A composition of matter for a fire retardant intumescent material having two stages of expansion as defined in claim 1 wherein said pre-expansion material comprises isobutane.

9. A composition of matter for a fire retardant intumescent material having two stages of expansion as defined in claim 1 wherein said pre-expansion material comprises liquid isobutane.

10. A composition of matter for a fire retardant intumescent material having two stages of expansion as defined in claim 1 wherein said primary expansion material comprises unexpanded vermiculite.

11. A composition of matter for a fire retardant intumescent material having two stages of expansion as defined in claim 1 wherein said primary expansion material comprises expanding graphite.

12. A composition of matter for a fire retardant intumescent material having two stages of expansion as defined in claim 1 wherein said primary expansion material comprises sodium silicate.

13. A composition of matter for a fire retardant intumescent material having two stages of expansion as défined in claim 1 wherein said primary expansion means is adapted to expand at approximately 325 degrees Fahrenheit.

14. A composition of matter for a fire retardant intumescent material having two stages of expansion as defined in claim 1 wherein said pre-expansion means is adapted to expand at approximately 210 degrees Fahrenheit.

15. A composition of matter for a fire retardant intumescent material having two stages of expansion as defined in claim 1 further comprising a heat fusible material mixed with said primary expansion material and said pre-expansion means, said heat fusible material adapted to harden responsive to application of heat thereto.

16. A composition of matter for a fire retardant intumescent material having two stages of expansion as defined in claim 15 wherein said heat fusible material includes:
   a) a polyvinyl chloride resin; and
   b) a plasticizer adapted to be fusible with respect to said polyvinyl chloride responsive to application of heat thereto.

17. A composition of matter for a fire retardant intumescent material having two stages of expansion as defined in claim 15 wherein said composition of matter is adapted to be positioned within a closed mold during heat fusion thereof and wherein the temperature required for heat fusion is at least as great as the temperature of expansion of said pre-expansion means.

18. A composition of matter for a fire retardant intumescent material having two stages of expansion as defined in claim 15 wherein said discrete encapsulation means comprises a plurality of microsphere shaped units.

19. A composition of matter for a fire retardant intumescent material having two stages of expansion as defined in claim 15 wherein said discrete encapsulation means is made from a latex material.

20. A composition of matter for a fire retardant intumescent material having two stages of expansion as defined in claim 15 wherein said discrete encapsulation means is made from vinylidene chloride.

21. A composition of matter a fire retardant intumescent material having two stages of expansion as defined in claim 15 wherein said discrete encapsulation means is made from vinyl acetate.

22. A composition of matter for a fire retardant intumescent material having two stages of expansion as defined in claim 15 wherein said discrete encapsulation means is made from an acrylic resin.

23. A composition of matter for a fire retardant intumescent material having two stages of expansion as defined in claim 15 wherein said discrete encapsulation means is made from an acrylic latex.

24. A composition of matter for a fire retardant intumescent material having two stages of expansion as defined in claim 15 wherein said pre-expansion material comprises isobutane.

25. A composition of matter for a fire retardant intumescent material having two stages of expansion as defined in claim 15 wherein said pre-expansion material comprises liquid isobutane.

26. A composition of matter for a fire retardant intumescent material having two stages of expansion as defined in claim 15 wherein said primary expansion material comprises unexpanded vermiculite.

27. A composition of matter for a fire retardant intumescent material having two stages of expansion as defined in claim 15 wherein said primary expansion material comprises expanding graphite.

28. A composition of matter for a fire retardant intumescent material having two stages of expansion as defined in claim 15 wherein said primary expansion material comprises sodium silicate.

29. A composition of matter for a fire retardant intumescent material having two stages of expansion as defined in claim 15 wherein said primary expansion means is adapted to expand at approximately 325 degrees Fahrenheit.

30. A composition of matter for a fire retardant intumescent material having two stages of expansion as defined in claim 15 wherein said pre-expansion means is adapted to expand at approximately 210 degrees Fahrenheit.

31. A composition of matter for a fire retardant intumescent material having two stages of expansion comprising:
 a) a primary expansion material of latex material adapted to expand responsive to being exposed to a temperature of approximately 325 degrees Fahrenheit;
 b) a pre-expansion means mixed throughout said primary expansion material and adapted to provide an additional stage of expansion responsive to a secondary given temperature of approximately 210 degrees Fahrenheit which is less than the expansion temperature of said primary expansion material, said pre-expansion material comprising:
  (1) a plurality of discrete encapsulation means comprising microspherically shaped units defining an internal chamber means therein;
  (2) a pre-expansion material comprising liquid isobutane located within said internal chamber means defined within said encapsulation means, said pre-expansion material adapted to expand responsive to a temperature of approximately 210 degrees Fahrenheit which is less than the expansion temperature of said primary expansion material;
 c) a heat fusible material fixed with said primary expansion material and said pre-expansion means, said heat fusible material adapted to harden within a closed mold responsive to application of heat thereto raising the temperature thereof to approximately 300 degrees Fahrenheit while preventing expansion of said pre-expansion material at that temperature due to confinement within the closed mold, said heat fusible material including:
  (1) a polyvinyl chloride resin; and
  (2) a plasticizer adapted to be fusible with respect to said polyvinyl responsive to application of heat thereto.

32. A process for making of a fire retardant intumescent material comprising:
 a) mixing of a heat fusible material;
 b) adding of a fire retardant material throughout the heat fusible material, the fire retardant material including a primary expansion means therein capable of expansion at a given temperature to facilitate formation of a fire-retardant barrier; and
 c) applying of heat to the heat fusible material positioned within the mold for heat fusing thereof.

33. A process for making of a fire retardant intumescent material having two stages of expansion as defined in claim 32 wherein the heat fusible material includes a polyvinyl chloride resin and a plasticizer to facilitate heat fusing thereof.

* * * * *